US008474987B2

(12) United States Patent
Nishida et al.

(10) Patent No.: US 8,474,987 B2
(45) Date of Patent: Jul. 2, 2013

(54) PROJECTOR HAVING LIGHT AMOUNT CONTROL BASED ON PROJECTION SYSTEM F-NUMBER

(75) Inventors: Kazuhiro Nishida, Sapporo (JP); Osamu Fujimaki, Matsumoto (JP); Katsumi Tanaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 290 days.

(21) Appl. No.: 12/796,993

(22) Filed: Jun. 9, 2010

(65) Prior Publication Data
US 2010/0328631 A1    Dec. 30, 2010

(30) Foreign Application Priority Data

Jun. 29, 2009  (JP) .................................. 2009-153416

(51) Int. Cl.
*G03B 21/14* (2006.01)
*G03B 21/20* (2006.01)
*G02B 26/02* (2006.01)
*G02B 9/00* (2006.01)
*G02B 9/08* (2006.01)

(52) U.S. Cl.
USPC ................ 353/97; 353/85; 353/88; 359/230; 359/233; 359/234; 359/235; 359/236; 359/738; 359/739

(58) Field of Classification Search
USPC .................... 353/88, 97, 75, 85–86; 359/227, 359/230, 233–236, 738–739
See application file for complete search history.

(56) References Cited

U.S. PATENT DOCUMENTS

| 5,777,804 | A  | * | 7/1998  | Nakamura et al. ............ 359/727 |
| 7,131,734 | B2 | * | 11/2006 | Kim et al. ........................ 353/97 |
| 7,344,255 | B2 | * | 3/2008  | Hara et al. ...................... 353/88 |
| 7,798,653 | B2 | * | 9/2010  | Inui et al. ........................ 353/97 |

FOREIGN PATENT DOCUMENTS

JP    A-2003-131323    5/2003

* cited by examiner

*Primary Examiner* — Tony Ko
*Assistant Examiner* — Jori S Reilly-Diakun
(74) *Attorney, Agent, or Firm* — Oliff & Berridge, PLC

(57) ABSTRACT

A projector includes: an illuminator that emits an illumination light flux; a light control mechanism that blocks at least part of the illumination light from the illuminator; a light modulator illuminated with the illumination light from the illuminator; a projection system capable of projecting modulated light formed by the light modulator and switching the f number when the modulated light is projected; and a control unit that controls the open/close state of the light control mechanism in accordance with the f number of the projection system so that illumination light having an angular distribution corresponding to the f number of the projection system is incident on the projection system.

7 Claims, 8 Drawing Sheets

PROJECTOR HAVING LIGHT AMOUNT CONTROL BASED ON PROJECTION SYSTEM F-NUMBER

BACKGROUND

1. Technical Field

The present invention relates to a projector that projects an image formed by a liquid crystal panel or any other suitable light modulator on a screen.

2. Related Art

There is, for example, a projector including a zoom lens as a projection system and a light source lamp whose luminance is adjusted in accordance with the focal length of the zoom lens (see JP-A-2003-131323). Any change in brightness of the projection image can thus be suppressed even when the size of the image is changed.

In the projector described in JP-A-2003-131323, however, since the brightness is adjusted by changing the output from the light source lamp, light is likely blocked in a projection system in an unintended manner, for example, by a lens barrel or a diaphragm when the zoom position of the zoom lens is set in a telescopic position. The light blockage may cause the projection system to be heated, disadvantageously often resulting in focus shift of the projection system. Further, when the luminance of the light source lamp is adjusted, the changeable amount of light is small and hence a stable amount of light is unlikely obtained.

SUMMARY

An advantage of some aspects of the invention is to provide a projector capable of preventing light rays from being incident on a projection system at unnecessary incident angles to suppress heating of the projection system and focus shift.

A projector according to an aspect of the invention includes an illuminator that emits an illumination light flux, a light control mechanism that blocks at least part of the illumination light from the illuminator, a light modulator illuminated with the illumination light from the illuminator, a projection system capable of projecting modulated light formed by the light modulator and switching the f number when the modulated light is projected, and a control unit that controls the open/close state of the light control mechanism in accordance with the f number of the projection system so that illumination light having an angular distribution corresponding to the f number of the projection system is incident on the projection system. "Having an angular distribution corresponding to the number" is not limited to achieving an angular distribution equal to that acceptable at a certain f number but can be achieving an angular distribution smaller than the angular distribution described above or an angular distribution that is larger than the angular distribution described above but controlled to approach the angular distribution described above.

According to the projector described above, the control unit changes the open/close state of the light control mechanism in accordance with the f number of the projection system. This operation allows illumination light having the angular distribution corresponding to the f number of the projection system to be incident on the projection system and prevents the illumination light from being blocked by a lens barrel, a diaphragm, or any other similar component in the projection system. The light blockage prevents the projection system from being heated unnecessarily, whereby no focus shift of the lens in the projection system will occur and it is not necessary to change the luminance of the illuminator itself in order to correct the defocus.

In a specific embodiment or aspect of the invention, the projection system is a zoom lens whose f number changes when the focal length is switched. In this case, the projection magnification can be changed by changing the angle of view of the light projected on a screen. Further, the projection system is less heated irrespective of the projection magnification.

In another aspect of the invention, the light control mechanism blocks at least part of the illumination light from the illuminator in an outermost area spaced apart from the optical axis. In this case, the amount of illumination light incident on the lens barrel and the diaphragm of the projection system, which causes unintended light blockage, can be reduced.

In still another aspect of the invention, the light control mechanism includes an openable/closeable light blocker disposed in the illuminator or on the light-exiting-side thereof, and the light blocker is preferably opened and closed in accordance with the number of the projection system under the control of the control unit in a stepwise manner having at least two stages. In this case, any change in the f number can be handled in a stepwise manner, and the light blocker can efficiently block light in advance.

In yet another aspect of the invention, when the f number of the projection system is large, the control unit closes the light blocker in such a way that the blocked area is greater than that when the f number is small to further block the illumination light. Unintended light blockage likely occurs when the f number of the projection system is large. In this case, the amount of unwanted illumination light incident on the projection system, which causes unintended light blockage, can be reduced.

In still yet another aspect of the invention, the control unit operates the light control mechanism in accordance with a projected image to increase or decrease the amount of blocked light within an acceptable range. In this case, the luminance of the illuminator can be changed with time in accordance with the brightness of the projected images, whereby the contrast thereof can be improved.

BRIEF DESCRIPTION OF THE DRAWINGS

The invention will be described with reference to the accompanying drawings, wherein like numbers refer to like elements.

DESCRIPTION OF EXEMPLARY EMBODIMENTS

First Embodiment

A projector into which a light control mechanism according to a first embodiment of the invention is incorporated will be described below with reference to FIG. 1 and other figures.

1. Summary of Structure of Projector

Figure 1:
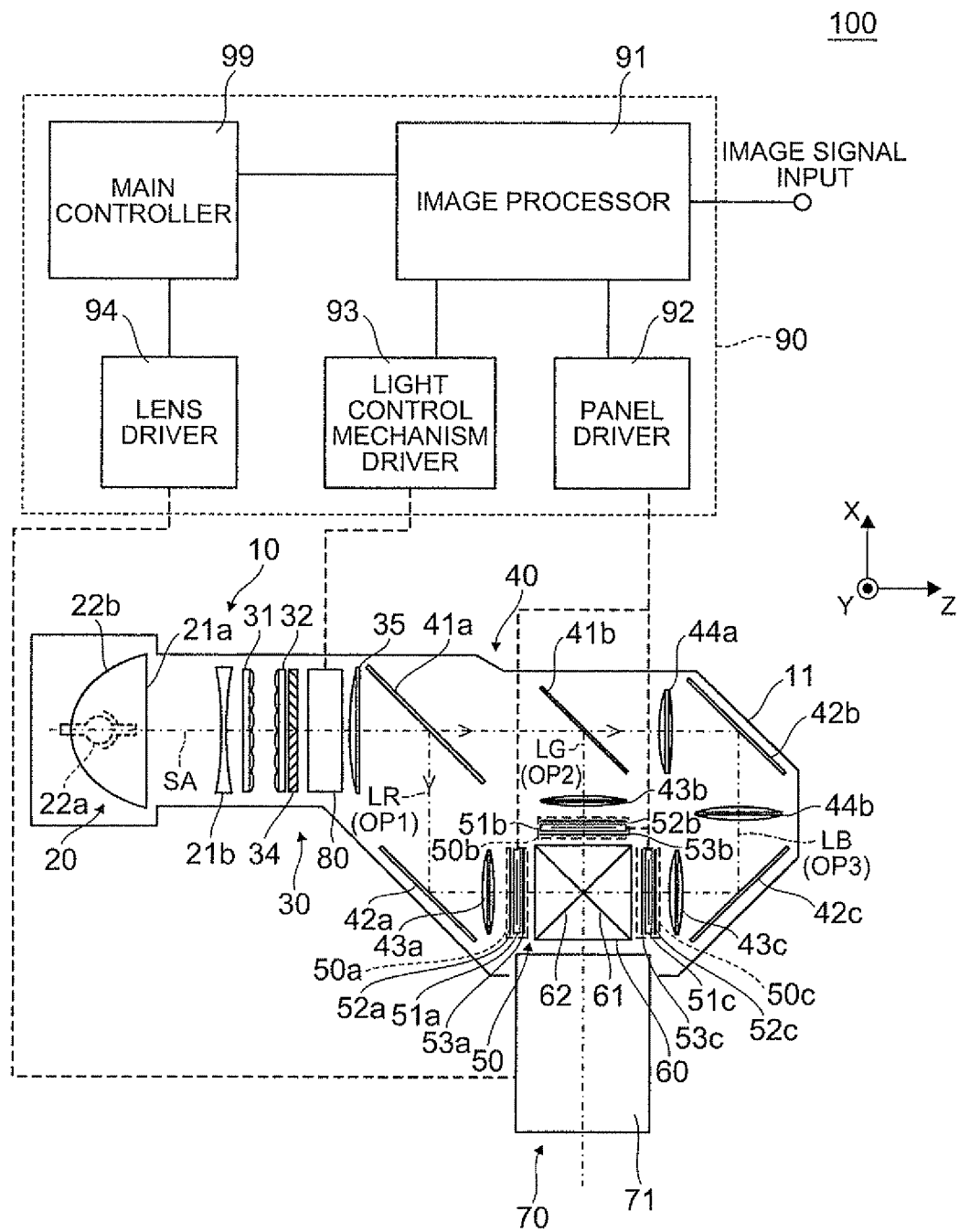
FIG. 1 conceptually shows a projector according to a first embodiment.

A projector 100 according to the present embodiment includes an illuminator 10, a light control mechanism 80, a color separation/light guiding system 40, a light modulation unit 50, a cross dichroic prism 60, a projection system 70, and a control unit 90, as shown in FIG. 1. Among the above components, the illuminator 10 includes a light source lamp unit 20 and a homogenizing system 30.

A substantially entire portion of the optical component that form the projector 100, that is, the illuminator 10, the light control mechanism 80, the color separation/light guiding system 40, the light modulation unit 50, the cross dichroic prism 60, and the projection system 70, are housed in a housing member 11, which is a light-blocking light guide. The optical components described above are assembled to a holder (not shown) provided, for example, on the inner surface of the housing member 11.

In the illuminator 10, the light source lamp unit 20 includes a lamp section 21a as a light source and a concave lens 21b. The lamp section 21a includes a lamp body 22a, which is, for example, a high-pressure mercury lamp, and a concave mirror 22b that reflects the light-source light and directs it forward. The concave lens 21b serves to convert the light-source light from the lamp section 21a into a light flux substantially parallel to a system optical axis SA or an illumination optical axis. The concave lens 21b may be omitted, for example, when the concave mirror 22b is a parabolic mirror.

The homogenizing system 30 includes first and second lens arrays 31, 32, a polarization conversion member 34, and a superimposing lens 35. Each of the first and second lens arrays 31, 32 is a fly's-eye lens formed of a plurality of element lenses arranged in a matrix. The element lenses that form the first lens array 31 divide the light flux emitted from the light source lamp unit 20 into a plurality of sub-light fluxes. The element lenses that form the second lens array 32 cause the sub-light fluxes from the first lens array 31 to exit at an appropriate diverging angle. The polarization conversion member 34 is formed, for example, of a PBS prism array, converts the light-source light having exited through the second lens array 32 into only light linearly polarized in a specific direction, and supplies the linearly polarized light to the subsequent optical system. The superimposing lens 35 causes the illumination light having exited through the second lens array 32 and passed through the polarization conversion member 34 to converge as a whole as appropriate, allowing superimposed illumination on liquid crystal light valves 50a, 50b, and 50c for respective colors provided in the light modulation unit 50.

The light control mechanism 80 is disposed between the polarization conversion member 34 and the superimposing lens 35, that is, in the illuminator 10, and blocks at least part of the illumination light emitted from the illuminator 10 and passing through an area spaced most apart from the optical axis, that is, in an outermost area, by opening or closing a pair of light-blockers 82a and 82b like double doors. The amount of illumination light is thus adjusted. The light control mechanism 80 can also improve the contrast of video images by operating the light control mechanism 80 in accordance with projected images to increase or decrease the amount of blocked light within an acceptable range.

Figure 2:
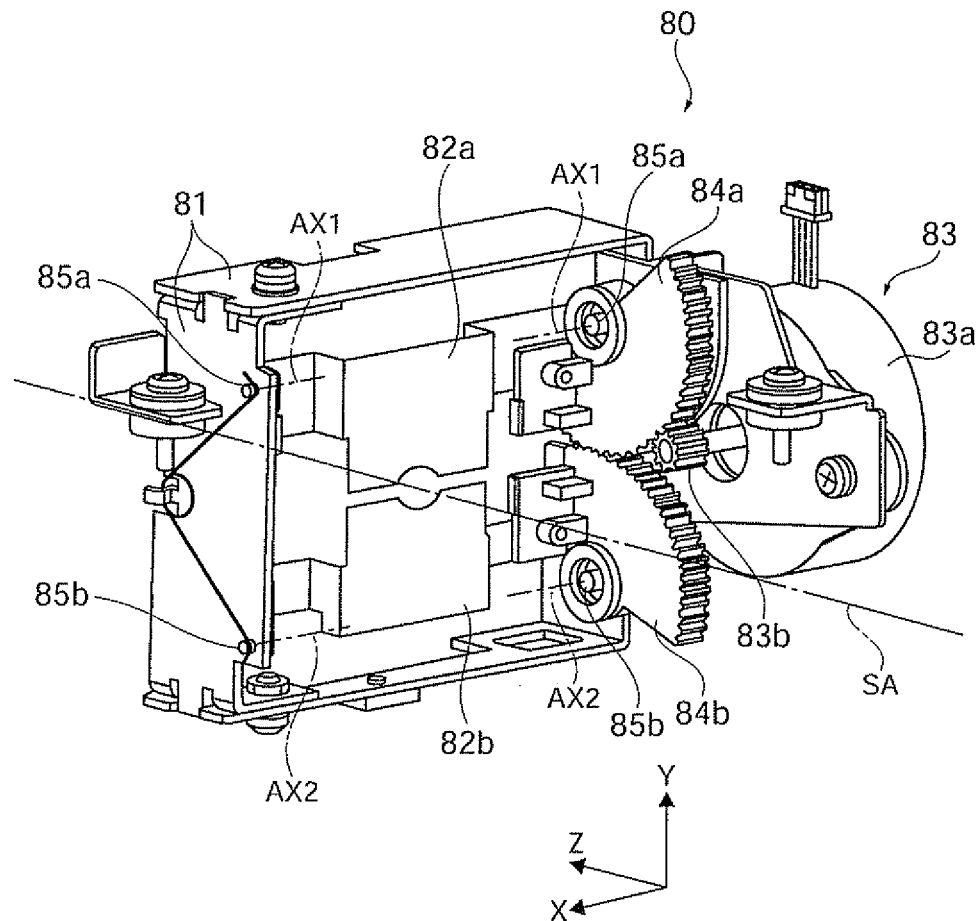
FIG. 2 is a perspective view describing the structure of a light control mechanism.

FIG. 2 is a perspective view describing the structure of the light control mechanism 80 and shows the light control mechanism 80 viewed from an upstream portion of the optical path. The light control mechanism 80 includes fixing members 81, the light blockers 82a and 82b, pivotal shafts 85a and 85b, and a drive mechanism 83. The fixing members 81 are fixed to part of the housing member 11 and support the pivotal shafts 85a and 85b and the drive mechanism 83. The pair of light blockers 82a and 82b are plate-shaped members supported by the pair of pivotal shafts 85a and 85b, respectively, and extending in the horizontal ±X directions perpendicular to the system optical axis SA. The pair of light blockers 82a and 82b are disposed on opposite sides of the system optical axis SA in a symmetric manner with respect thereto. Further, the pair of light blockers 82a and 82b are pivotally supported by the pair of pivotal shafts 85a and 85b so that they can pivot around pivotal axes AX1 and AX2. The drive mechanism 83 opens and closes the light blockers 82a and 82b. The drive mechanism 83 includes a motor 83a, a transmission 83b, and a pair of drive gears 84a and 84b. Rotation of the motor 83a is transferred via the transmission 83b to the pair of drive gears 84a and 84b pivotally supported around the pair of pivotal shafts 85a and 85b. Since the upper drive gear 84a and the lower drive gear 84b rotate in opposite directions in synchronization with each other, the light blockers 82a and 82b fixed to the pair of drive gears 84a and 84b also rotate in synchronization with each other. It is, however, noted that since the light blockers 82a and 82b are disposed in positions spaced apart from the respective pivotal shafts AX1 and AX2, the front ends of the light blockers 82a and 82b approach the system optical axis SA, which is an approaching state or a light blocking state (not shown), or move away from the system optical axis SA, which is an extracting state or a non-light-blocking state (shown), as the motor 83a rotates in forward or reverse direction.

Returning to FIG. 1, the color separation/light guiding system 40 includes first and second dichroic mirrors 41a, 41b, reflection mirrors 42a, 42b, and 42c, and three field lenses 43a, 43b, and 43c. The color separation/light guiding system 40 separates the illumination light emitted from the light source lamp unit 20 into red (R), green (G), and blue (B) three color light beams and guides the color light beams to the downstream liquid crystal light valves 50a, 50b, and 50c. More specifically, the first dichroic mirror 41a first reflects R illumination light LR among the RGB three light beams and transmits G illumination light LG and B illumination light LB. The second dichroic mirror 41b reflects G illumination light LG of the GB two light beams and transmits B illumination light LB. That is, the red light LR reflected off the first dichroic mirror 41a is guided along a first optical path OP1 on which the field lens 43a is disposed. The green light LG having passed through the first dichroic mirror 41a and having been reflected off the second dichroic mirror 41b is guided along a second optical path OP2 on which the field lens 43b is disposed. The blue light LB having passed through the second dichroic mirror 41b is guided along a third optical path OP3 on which the field lens 43c is disposed. The field lenses 43a, 43b, and 43c for the respective colors adjust the incident angles of the sub-light fluxes that have exited through the second lens array 32 and will be incident on the light modulation unit 50 to appropriately converge or diverge with respect to the system optical axis SA on illuminated areas of the liquid crystal light valves 50a, 50b, and 50c. A pair of relay lenses 44a and 44b are disposed along the third optical path OP3, which is longer than the first and second optical paths OP1, OP2, and prevents light usage efficiency from decreasing due to light diffusion and other reasons by transferring an image formed immediately upstream of the light-incident-side first relay lens 44a, with the image substantially unchanged, to the light-exiting-side field lens 43c.

The light modulation unit 50 includes the three liquid crystal light valves 50a, 50b, and 50c, on which the three illumination light beams LR, LG, and LB are incident. The liquid crystal light valves 50a, 50b, and 50c serve as light modulators that include liquid crystal panels 51a, 51b, and 51c disposed at the center of the respective liquid crystal light valves 50a, 50b, and 50c, light-incident-side polarizing filters 52a, 52b, and 52c disposed on one side of the respective liquid crystal panels 51a, 51b, and 51c, and light-exiting-side polarizing filters 53a, 53b, and 53c disposed on the other side of the respective liquid crystal panels 51a, 51b, and 51c so that the liquid crystal panels 51a, 51b, and 51c are sandwiched between the respective polarizing filters 52a, 52b, and 52c and polarizing filters 53a, 53b, and 53c. The color light beams LR, LG, and LB incident on the respective liquid crystal light valves 50a, 50b, and 50c undergo intensity modulation on a pixel basis in accordance with drive or control signals inputted as electric signals to the liquid crystal light valves 50a, 50b, and 50c.

The cross dichroic prism 60 is a light combining system for synthesizing a color image and contains a first dichroic layer 61 for reflecting R light and a second dichroic layer 62 for reflecting B light that are arranged in an X shape in a plan view. In the cross dichroic prism 60, the red light LR from the liquid crystal light valve 50a is reflected off the first dichroic layer 61 and exits to the right when viewed in the traveling direction. The green light LG from the liquid crystal light valve 50b passes through the dichroic layers 61 and 62 and goes straight through the cross dichroic prism 60. The blue light LB from the liquid crystal light valve 50c is reflected off the second dichroic layer 62 and exits to the left when viewed in the travelling direction.

Figure 3:
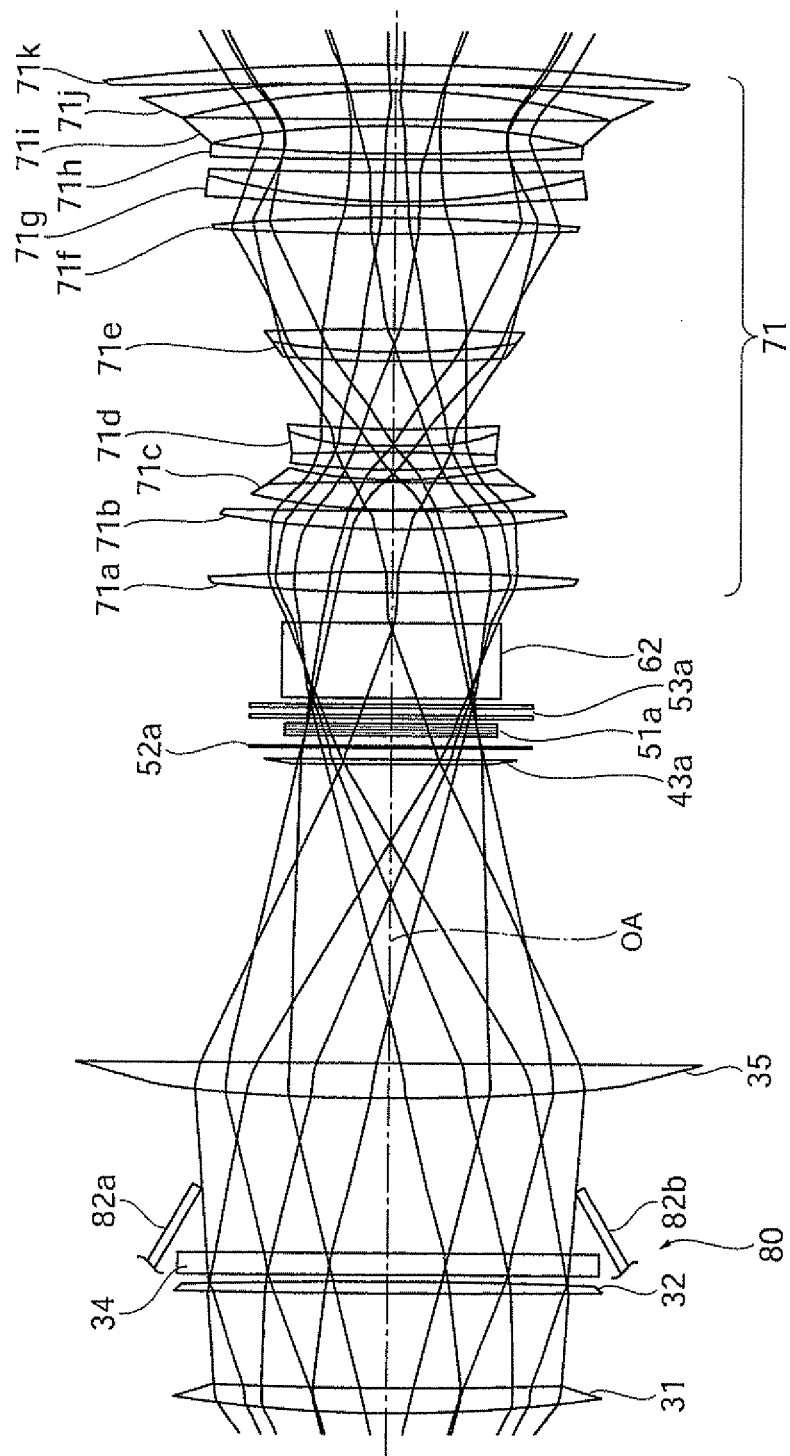
FIG. 3 describes how light rays travel when a projection system has a telescopic setting.
Figure 4:
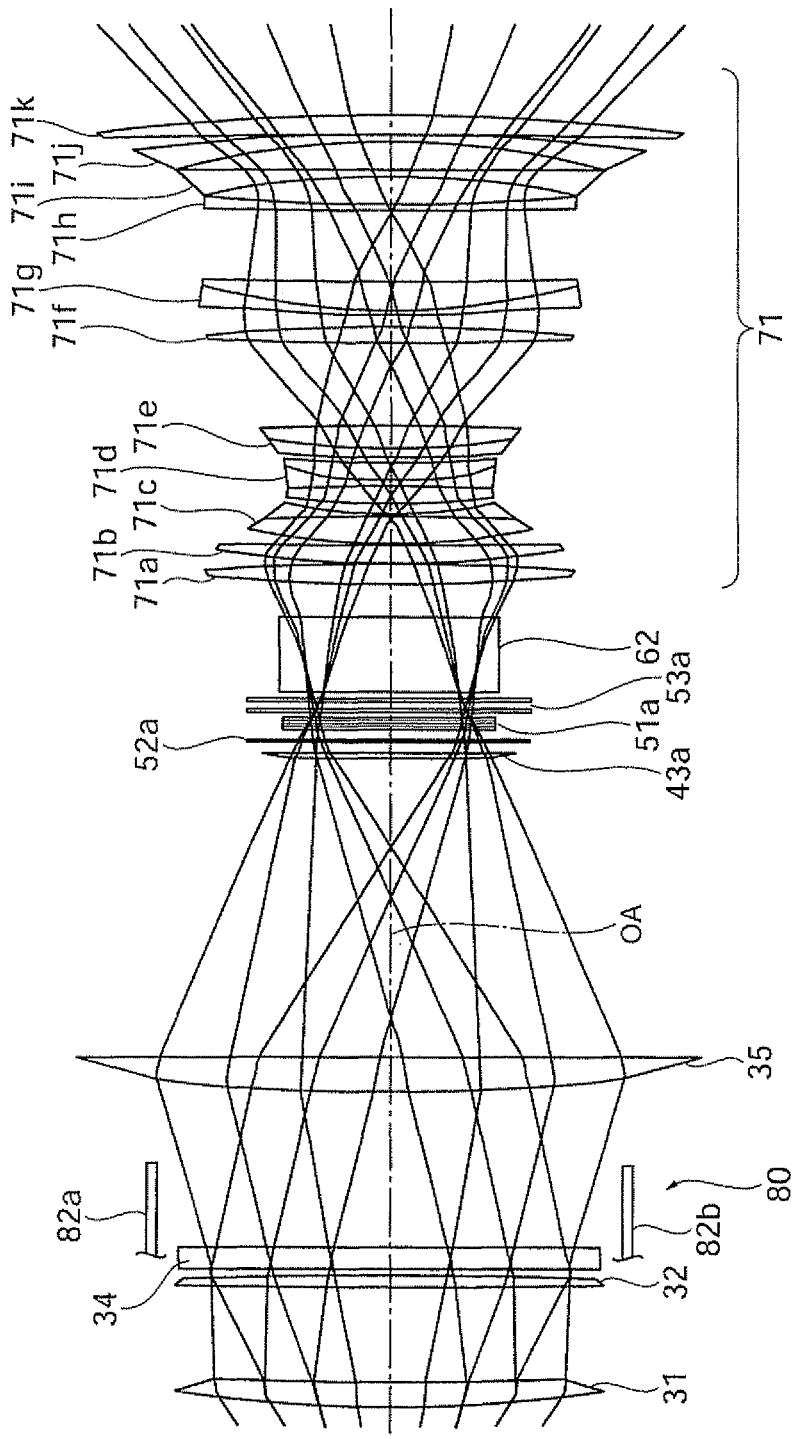
FIG. 4 describes how light rays travel when the projection system has a wide-angle setting.

The projection system 70 includes an enlarging projection lens 71 in a lens barrel and projects modulated image light as a color image formed by the light modulation unit 50 and combined in the cross dichroic prism 60 on a screen (not shown). The projection system 70 is a zoom lens whose f number changes when the focal length is switched, and the projection magnification or the zoom magnification can be continuously changed from a wide-angle side to a telescopic side when the modulated light is projected. The projection system 70 includes a plurality of lenses 71a, 71b, 71c, 71d, 71e, 71f, 71g, 71h, 71i, 71j, and 71k that form the projection lens 71 and a diaphragm (not shown) associated with the projection lens 71, as shown in FIGS. 3 and 4. When the plurality of lenses 71a, 71b, 71c, 71d, 71e, 71f, 71g, 71h, 71i, 71j, and 71k are arranged as shown in FIG. 3, the zoom position of the projection system 70 is on the telescopic side. On the other hand, when the plurality of lenses 71a, 71b, 71c, 71d, 71e, 71f, 71g, 71h, 71i, 71j, and 71k are arranged as shown in FIG. 4, the zoom position of the projection system 70 is on the wide-angle side. The lens arrangements shown in FIGS. 3 and 4 are deformed in such a way that they are compressed in the direction of the optical axis OA for illustration purposes.

The control unit 90 includes an image processor 91 to which a video signal and other external image signals are inputted, a panel driver 92 that drives the liquid crystal light valves 50a, 50b, and 50c based on the output from the image processor 91, a light control mechanism driver 93 that drives the light control mechanism 80 based on the output from the image processor 91, a lens driver 94 that adjusts the lens arrangement in the projection lens 71 (see FIGS. 3 and 4), and a main controller 99 that controls the operations of the circuit sections 91, 94 and other sections.

In the control unit 90, the image processor 91 can correct an inputted external image signal as appropriate and display character or other information in place of or in addition to the external image signal.

The panel driver 92 produces drive signals that adjust the states of the liquid crystal light valves 50a, 50b, and 50c based on the image signal having been outputted from the image processor 91 and having undergone image processing. Each of the liquid crystal light valves 50a, 50b, and 50c can thus form an image in the form of transmission distribution corresponding to the image signal inputted from the image processor 91.

The light control mechanism driver 93 controls the open/close state of the light control mechanism 80. The light control mechanism driver 93 operates the light control mechanism 80 in a continuous or stepwise manner between the approaching state, in which the light blockers 82a and 82b partially block the optical path, and the retracting state, in which the light blockers 82a and 82b do not block the light path at all.

The lens driver 94 switches the projection magnification by changing the lens arrangement of the projection lens 71. Specifically, having received a projection magnification changing signal issued, for example, by a user's key operation, the lens driver 94 operates a drive mechanism formed of an actuator, a cam mechanism, and other components (not shown) and incorporated in the projection system 70 to change the arrangement of the lenses 71a, 71b, 71c, 71d, 71e, 71f, 71g, 71h, 71i, 71j, and 71k, which form the projection lens 71 as appropriate. It is thus possible to arbitrarily change the state of the projection system 70 between a telescopic state and a wide-angle state. The projection system 70 is provided with a zoom position sensor, which allows the lens driver 94 to check the zoom position of the projection system 70 at any time.

The main controller 99 is formed of a microcomputer and operates based on a program prepared as appropriate in order to control the image processor 91 and other components. The main controller 99 also controls the open/close operation of the light control mechanism 80 in accordance with the f number, that is, the projection magnification of the projection system 70.

2. Light-Blocking Area Adjustment Performed by Light Control Mechanism

Figure 5B:
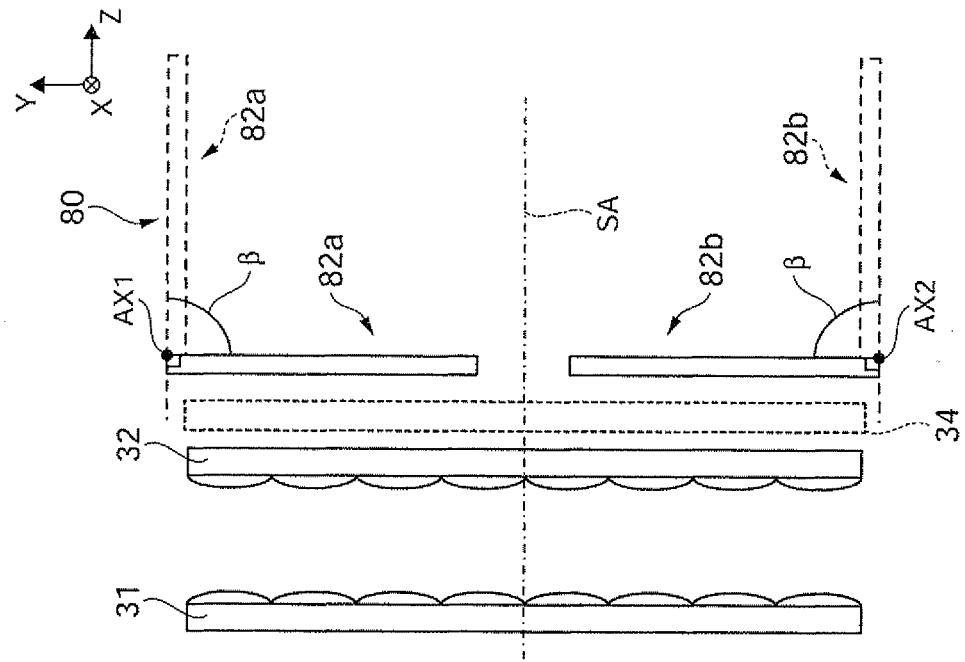
FIGS. 5A and 5B describe open/close operations of a light control mechanism in the projector.
Figure 5A:
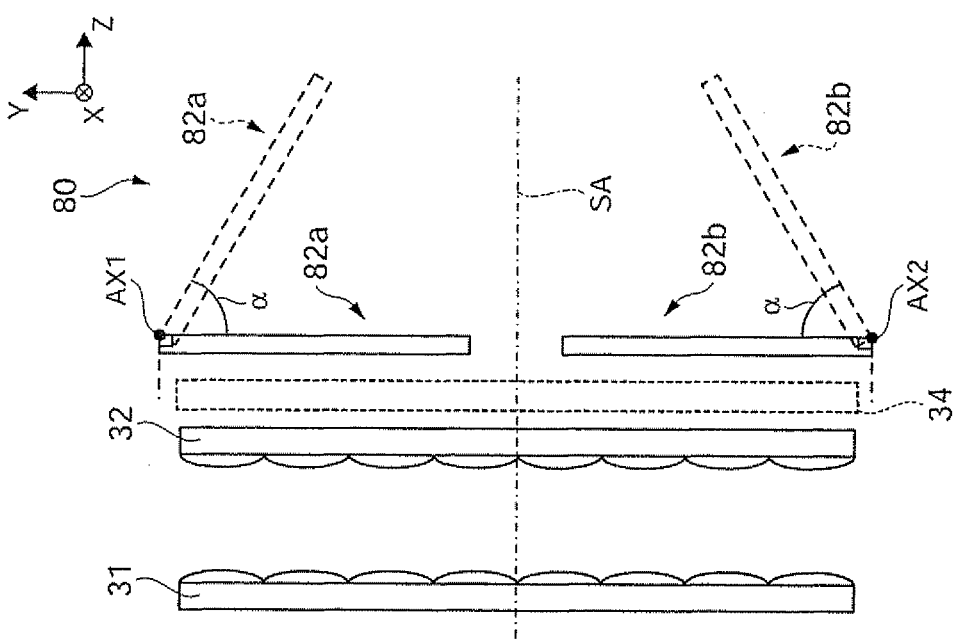

FIGS. 5A and 5B are enlarged conceptual diagrams showing part of the components shown in FIG. 2 and describing change in illumination light flux when the light control mechanism 80 is operated. FIGS. 5A and 5B diagrammatically show the pair of light blockers 82a and 82b (only primary portion) as the light control mechanism 80.

The light blockers 82a and 82b of the light control mechanism 80 are opened and closed in accordance with the f number of the projection system 70 under the control of the control unit 90 in a stepwise manner having at least two stages. In the present embodiment, the light blockers 82a and 82b can be continuously opened and closed between the approaching and extracting states in accordance with the f number. The amount of blocked illumination light is adjusted by opening or closing the light blockers 82a and 82b, for example, in order to prevent light from being blocked in an unintended manner in the projection system 70. When the zoom position of the projection lens 71 is on the telescopic side, as shown, for example, in FIG. 3, the light blockers 82a and 82b are moved from a fully closed position (solid lines in FIG. 5A), which corresponds to a fully closed state, to a fully open position (broken lines in FIG. 5A), which is a state in which the light blockers 82a and 82b are opened by a pivotal angle α (60 degrees, for example) from the fully closed state, as shown in FIG. 5A. On the other hand, when the zoom position of the projection lens is on the wide-angle side, as shown in FIG. 4, the light blockers 82a and 82b are moved from the fully closed position (solid lines in FIG. 5B), which corresponds to the fully closed state, to a fully open position (broken lines in FIG. 5B), which corresponds to a state in which the light blockers 82a and 82b are opened by a pivotal angle β (90 degrees, for example) from the fully closed state, as shown in FIG. 5B. In each of the zoom positions, the light blockers 82a and 82b are allowed to be opened and closed from the fully closed position to the respective fully open positions. That is, the range within which the light blockers 82a and 82b are allowed to be opened and closed at the time of telescopic imaging is narrower than the range within which the light blockers 82a and 82b are allowed to be opened and closed at the time of wide-angle imaging or other imaging operations. The light blockers 82a and 82b are thus allowed to be opened and closed within the range according to the zoom position and adjust the amount of blocked illumination light. The open/close operation described above allows the pair of light blockers 82a and 82b to adjust the amount of blocked light having exited through the second lens array 32 to a value ranging from zero to a fraction of one-tenth or smaller, for example, when the zoom position is on the wide-angle side.

Specifically, the light control mechanism 80 shown in FIG. 3 achieves the state corresponding to the fully open position (open state indicated by dotted lines) for the zoom position on the telescopic side. The light control mechanism 80 shown in FIG. 4 achieves the state corresponding to the fully open position (open state indicated by dotted lines) for the zoom position on the wide-angle side. In each of the zoom positions, the illumination light flux having passed through the light control mechanism 80 corresponds to the f number of the projection system 70.

3. Light Control Operation of Projector

Figure 6:
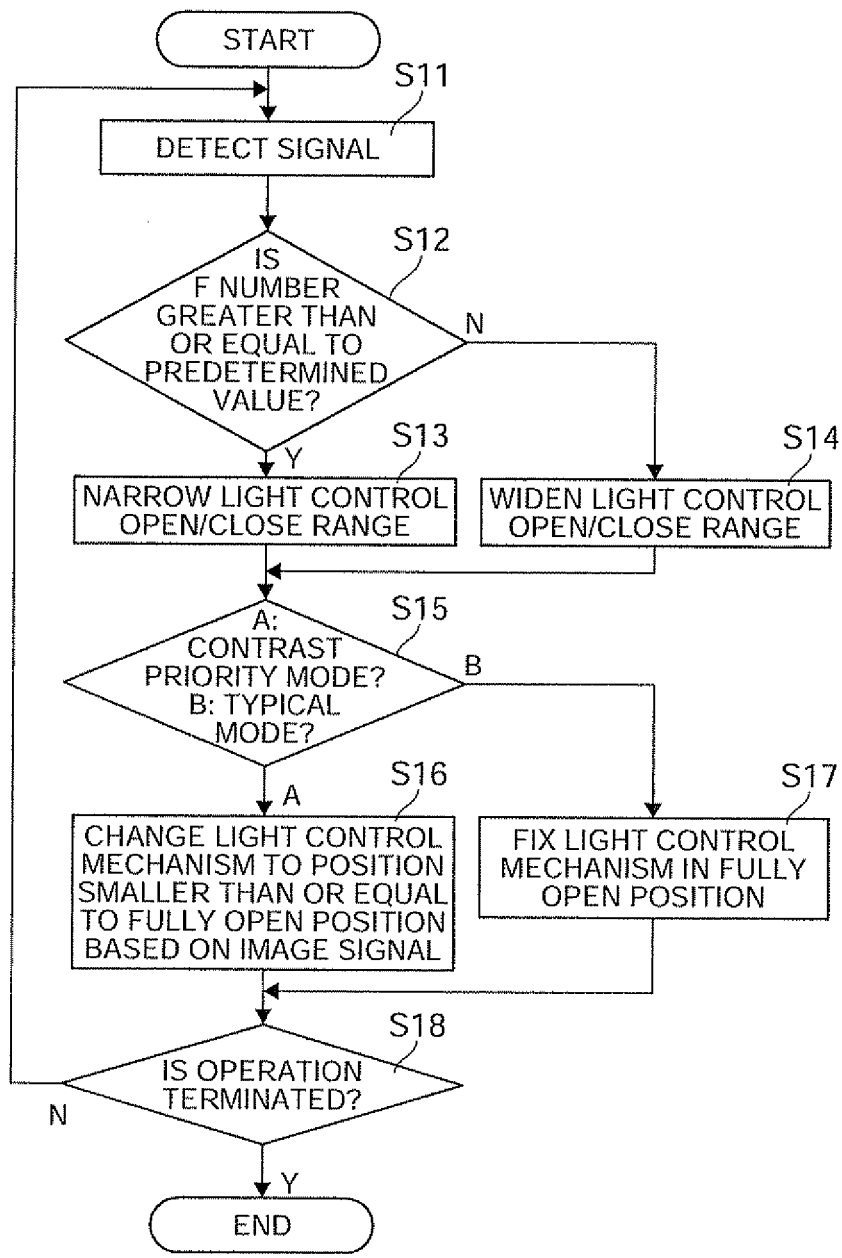
FIG. 6 is a flowchart describing the operation of the projector.

The light control operation of the projector 100 will be described below with reference to the flowchart shown in FIG. 6.

First, when a video signal is inputted to the projector 100 via an image signal input terminal, the image processor 91 detects a brightness peak in the image based on the video signal, outputs the brightness peak to the main controller 99, and converts the resolution of the video signal into an appropriate value that matches the number of pixels of the liquid crystal light valves 50a, 50b, and 50c (step S11).

The main controller 99 then identifies the f number of the projection system 70, for example, from the state of the lens driver 94 (step S12). When the f number of the projection system 70 is greater than or equal to a predetermined value, that is, when the zoom position is on the telescopic side and the projection magnification is a predetermined value or lower (Y in step S12), the control unit 90 narrows the openable/closeable range (acceptable range) of the light control mechanism 80 (step S13). Specifically, the acceptable range ranges from the fully open position to the fully closed position shown in FIG. 5A. The setting of the acceptable range is temporarily stored in a memory in the main controller 99. On the other hand, when the f number of the projection system 70 is smaller than the predetermined value, that is, when the zoom position is on the wide-angle side and the projection magnification is higher than a predetermined value (N in step S12), the control unit 90 widens the openable/closeable range (acceptable range) of the light control mechanism 80 (step S14). Specifically, the acceptable range ranges from the fully open position to the fully closed position shown in FIG. 5B. The setting of the acceptable range is temporarily stored in the memory in the main controller 99.

Thereafter, the main controller 99 judges from the video signal provided from the image processor 91 whether the image is set to a contrast priority mode or a typical mode (step S15). When the image is set to the contrast priority mode (A in step S15), the main controller 99 opens/closes the light blockers 82a and 82b of the light control mechanism 80 based on the video signal to a position smaller than or equal to the fully open position in FIG. 5A (step S16). When the zoom position is on the telescopic side, the control unit 90 controls the amount of light by setting the open/close state of the light control mechanism 80 to a position smaller than or equal to the fully open position shown in FIG. 5A, whereby the illumination light having the angular distribution corresponding to the f number of the projection system 70 is incident on the projection system (see FIG. 3). On the other hand, when the zoom position is on the wide-angle side, the control unit 90 controls the amount of light by setting the open/close state of the light control mechanism 80 to a position smaller than or equal to the fully open position shown in FIG. 5B, whereby the illumination light having the angular distribution corresponding to the f number of the projection system 70 is incident on the projection system (see FIG. 4). In this way, when the f number of the projection system 70 is large, the control unit 90 closes the light blockers 82a and 82b in such a way that the blocked area is greater than that when the f number is small to further block the illumination light flux in an area spaced most apart from the optical axis OA, that is, in an outermost area. On the other hand, when the typical mode is chosen (B in step S15), the main controller 99 fixes the light blockers 82a and 82b of the light control mechanism 80 in the fully open position shown in FIG. 5A or 5B in accordance with the zoom position (step S17). For example, in the contrast priority mode, the image processor 91 performs gain adjustment in which the brightness signal in the video signal is adjusted based on an instruction from the main controller 99. The main controller 99 determines the amount of gain adjustment based on the brightness peak in the image provided from the image processor 91 and returns the result to the image processor 91. The image processor 91 can also correct distortion of the image in accordance with the operation of opening or closing the light control mechanism 80.

The control of the open/close state of the light control mechanism 80 described above is not limited to achieving an angular distribution equal to that acceptable at a certain f number but can be performed to achieve an angular distribution smaller than the angular distribution described above. Further, even an angular distribution larger than that acceptable at a certain f number can be controlled to approach the acceptable angular distribution, as compared with the state in which no light blocking is made by the light control mechanism 80. That is, controlling the fully open position of the light control mechanism 80 to achieve an angular distribution corresponding to an f number means that the light control mechanism 80 prevents unintended light blockage in the vicinity of or in a position smaller than the fully open position within the acceptable range according to the f number.

After carrying out the operation in step 816 or S17, the main controller 99 returns to step S11 (N in step 818) until a power turn-off instruction or any other instruction is issued to terminate the operation (Y in step 818).

According to the projector 100 described above, the light control mechanism driver 93 in the control unit changes the open/close state of the light control mechanism 80 in accordance with the f number of the projection system 70. This operation allows illumination light having the angular distribution corresponding to the f number of the projection system 70 to be incident on the projection system 70 and prevents in advance the illumination light from being blocked by the lens barrel, the diaphragm, or any other similar component in the projection system 70. The light blockage prevents the projection system 70 from being heated unnecessarily, whereby no focus shift of the lens in the projection system 70 will occur and it is not necessary to change the luminance of the illuminator 10 itself in order to correct the defocus.

Figure 7:
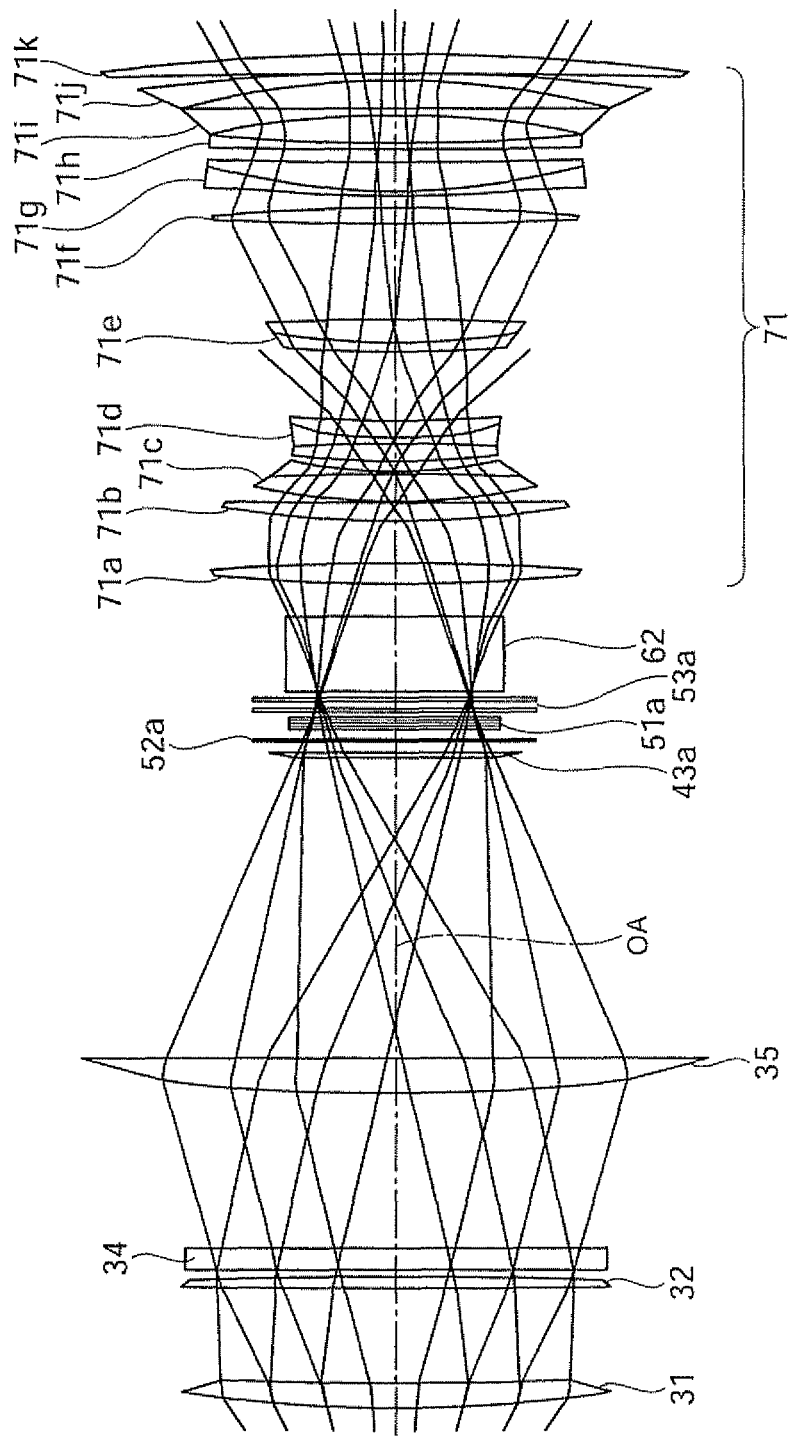
FIG. 7 describes an example to be compared with FIG. 3.

Specifically, when the zoom position of the projection system 70 is on the telescopic side, narrowing the open-side open/close range of the light blockers 82a and 82b of the light control mechanism 80 allows the illumination light in an outer area to be blocked even when the light control mechanism 80 is set in the fully open position. It is therefore possible to reduce the amount of unwanted light incident on the projection system 70, which causes unintended light blockage, as compared with a case where the light control mechanism 80 does not block light as shown in FIG. 7.

Second Embodiment

Figure 8:
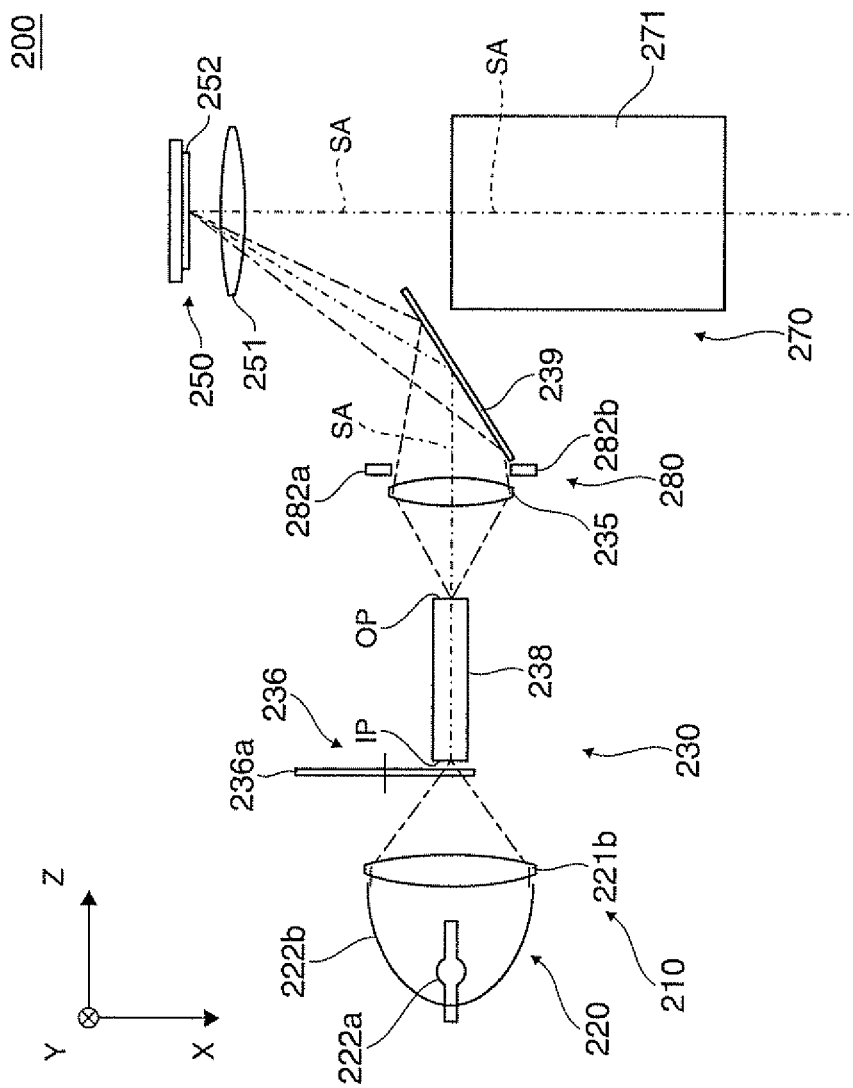
FIG. 8 describes a projector according to a second embodiment.

A projector of a second embodiment will be described below with reference to FIG. 8. A projector 200 of the present embodiment is obtained by modifying the projector 100 of the first embodiment, and the portions that will not particularly be described are the same as those in the first embodiment.

The projector 200 includes an illuminator 210, a light control mechanism 280, a light modulation unit 250, and a projection system 270. The illuminator 210 includes a light source lamp unit 220 and an illumination system 230. The light source lamp unit 220 includes a discharge light emission-type lamp body 222a, a parabolic concave mirror 222b, and a light collector lens 221b. The illumination system 230 includes a color wheel 236, a rod integrator 238, and a superimposing lens 235. The light control mechanism 280 includes light blockers 282a and 282b. The light modulation unit 250 includes a field lens 251 and a digital micromirror device 252. The digital micromirror device 252 is a reflection direction controlled light modulator.

The light control mechanism 280 in the projector 200 is disposed between the superimposing lens 235 and a mirror 239, that is, on the light-exiting side of the illuminator 210. Each of the light blockers 282a and 282b of the light control mechanism 280 is, for example, a plate-shaped member disposed in perpendicular to the system optical axis SA and capable of sliding to open and close in the direction perpendicular to the system optical axis SA (XY direction in FIG. 8). The open/close range (acceptable range) of the light blockers 282a and 282b is determined based on the f number, that is, the zoom position of the projection system 270, as in the first embodiment.

The projection system 270, which is formed of a projection lens 271, projects modulated image light as a color image formed by the light modulation unit 250 on a screen (not shown). The projection system 270 is a zoom lens whose f number changes when the focal length is switched, as in the case of the projection system 70 in the first embodiment, and the projection magnification can be continuously changed from a wide-angle side to a telescopic side when the modulated light is projected.

The operation of the projector 200 of the present embodiment will be described below.

The illumination light emitted from the light source lamp unit 220 is incident on the color wheel 236. The color wheel 236 can be rotated by a motor (not shown), and four color filters formed, for example, of RGB three color filters and a transparent (white) portion are arranged in a fan shape on a filter surface 236a facing the light source lamp unit 220. The illumination light incident on the filter surface 236a undergoes time-course color separation and exits as RGB three color beams. Each of the converging RGB color illumination light beams having passed through the color wheel 236 is incident on a light incident plane IP of the rod integrator 238 and travels through the rod integrator 238, where the illumination light beam is divided into light fluxes, and the divided light fluxes are temporarily superimposed and exit through a light exiting plane OP. The illumination light having exited through the rod integrator 238 passes through the superimposing lens 235, is deflected off the mirror 239, and uniformly illuminates the light modulation unit 250. At this point, the open/close state of the light control mechanism 280 is controlled in accordance with the f number of the projection system 270, and the illumination light having the angular distribution corresponding to the f number or the zoom position of the projection system 270 is incident on the projection system 270. The illumination light incident on the digital micromirror device 252 is reflected off micromirrors corresponding to pixels for a necessary period in accordance with an image signal, and image light, which is the reflected light, exits in the normal direction toward the projection system 270. The image light reflected off the digital micromirror device 252 passes through the field lens 251 and is projected through the projection system 270 on the screen (not shown).

The invention is not limited to the embodiments described above but may be implemented in a variety of aspects to the extent that they do not depart from the spirit of the invention. For example, the following variations are conceivable:

That is, in the first embodiment described above, the light control mechanism 80 is formed of the light blockers 82a and 82b, which opens and closes like double doors. The light control mechanism 80 may alternatively be formed of, for example, a pair of masks having a plurality of stripe-shaped openings, which slide to adjust the sizes of the plurality of openings.

Further, in the embodiments described above, the lamp bodies 22a and 222a used in the light source lamp units 20 and 220 may conceivably be replaced with a metal halide lamp or any other variety of lamps. Moreover, the illuminator 10 may be a light source with no sub-mirror.

In the first embodiment described above, a pair of lens arrays 31 and 32 is used to divide the light from the light source lamp unit 220 into a plurality of sub-light fluxes. The invention is also applicable to a projector that does not use the lens arrays. Further, the lens arrays 31 and 32 may be replaced with a rod integrator.

In the first embodiment described above, the polarization conversion member 34 is used to convert the light from the light source lamp unit 20 into light polarized in a specific direction. The invention may also be applicable to a projector that does not use the polarization conversion member 34.

The above embodiments have been described with reference to the case where the invention is applied to the projector including the transmissive liquid crystal light valves 50a, 50b, and 50c. The invention is also applicable to a projector including reflective light valves. The word "transmissive" used herein means that a light valve including a liquid crystal panel and other components transmits light, whereas the word "reflective" means that the light valve reflects light.

Projectors are categorized into two types: a front projection projector that projects an image from the viewer's side, where the viewer observes the projection surface, and a rear projection projector that projects an image from the side that is opposite the viewer's side, where the viewer observes the projection surface. The configurations of the projectors 100 and 200 shown in FIG. 1 and other figures are applicable to the two types of projector.

The first embodiment has been described with reference only to the projector 100 using the three light valves 50a, 50b, and 50c. The invention is also applicable to a projector using one light valve, a projector using two light valves, and a projector using four or more light valves.

The entire disclosure of Japanese Patent Application No. 2009-153416, filed Jun. 29, 2009 is expressly incorporated by reference herein.

What is claimed is:

1. A projector comprising:
an illuminator that emits an illumination light;
a light control mechanism that blocks at least part of the illumination light from the illuminator;
a light modulator illuminated with the illumination light from the illuminator;
a projection system capable of projecting modulated light formed by the light modulator and switching the f number when the modulated light is projected; and
a control unit that operates the light control mechanism in accordance with a projected image to increase or decrease the amount of blocked light within an acceptable range,
wherein the control unit controls the acceptable range by setting a fully open position in accordance with the f number of the projection system so that a size of the acceptable range changes in correspondence with the f number of the projection system,
the light control mechanism includes an openable/closeable light blocker disposed in the illuminator or on a light-exiting-side thereof,
when the projected image is set to a contrast priority mode, the control unit opens or closes the openable/closeable light blocker based on a video signal of the projected image to a position smaller than or equal to the fully open position in accordance with the f number of the projection system, and
when the projected image is set to a typical mode, the control unit fixes the openable/closeable light blocker in the fully open position in accordance with the f number of the projection system.

2. The projector according to claim 1,
wherein the projection system is a zoom lens whose f number changes when the focal length is switched.

3. The projector according to claim 1,
wherein the light control mechanism blocks at least part of the illumination light from the illuminator in an outermost area spaced apart from the optical axis.

4. The projector according to claim 1,
wherein the light blocker is opened and closed within the acceptable range under the control of the control unit in a stepwise manner having at least two stages.

5. The projector according to claim 4,
wherein when the f number of the projection system is large, the control unit sets the fully open position at a first angle α to narrow the acceptable range, and when the f number is small, the control unit sets the fully open position at a second angle β that is larger than α to widen the acceptable range.

6. The projector according to claim 1, further comprising:
a lens adapted to convert the illumination light into light substantially parallel to an optical axis of the illuminator,
wherein the light control mechanism receives the light from the lens.

7. The projector according to claim 1,
wherein the light control mechanism includes a light blocker mounted on a pivotable shaft, the light blocker is adapted to move within the acceptable range by pivoting about the pivotable shaft.

* * * * *